United States Patent [19]

Endo et al.

[11] 4,043,909
[45] Aug. 23, 1977

[54] APPARATUS AND METHOD FOR SOLIDIFICATION OF SLUDGES

[75] Inventors: Masaaki Endo, Saitama; Mitsuo Miura; Yoshinori Kukino, both of Tokyo; Kimio Kikuchi, Saitama; Hayao Aoyagi, Chiba, all of Japan

[73] Assignee: Takenaka Komuten Co., Ltd., Osaka, Japan

[21] Appl. No.: 753,199

[22] Filed: Dec. 22, 1976

[51] Int. Cl.² .............................................. C02B 1/20
[52] U.S. Cl. ...................................... 210/49; 210/170; 210/208; 210/219; 61/36 R; 61/63; 259/17; 259/93; 259/102; 259/104
[58] Field of Search ................... 210/10, 49, 66, 170, 210/208, 219; 259/12, 17, 21, 40, 41, 91-93, 102-104; 61/35, 36 R, 53.64, 63

[56] References Cited

U.S. PATENT DOCUMENTS

| 3,357,812 | 12/1967 | Snell | 23/259.1 |
|---|---|---|---|
| 3,509,949 | 5/1970 | Kukihara | 37/65 |
| 3,861,157 | 1/1975 | Hillen | 61/63 |
| 3,908,387 | 9/1975 | Nakamura | 61/63 |

Primary Examiner—Wilbur L. Bascomb, Jr.
Assistant Examiner—Benoit Castel

[57] ABSTRACT

An apparatus for the solidification of sludges comprising an apparatus proper which can be moved in the vertical direction by lifting means and a casing surrounding the kneading zone of said apparatus proper and being capable of shifting in the vertical direction with respect to said apparatus proper. The apparatus proper includes agitating shafts driven and rotated by driving means and agitating blades attached to each agitating shaft to form the kneading zone. A hardener supply device is disposed in the kneading zone to feed a hardener to the kneading zone. The casing is arranged so that the sludge being treated is separated and partitioned from other sludge, and the vertical position of the casing can be changed so that a desirable treating condition is maintained in the sludge being treated.

4 Claims, 12 Drawing Figures

APPARATUS AND METHOD FOR SOLIDIFICATION OF SLUDGES

BACKGROUND OF THE INVENTION

The present invention relates to an apparatus and method for the solidification of sludges by kneading sludges in soft ground layers with a hardener and solidifying the sludges.

As the conventional method for solidifying sludges deposited and accumulated in bottom portions of harbors, bays, rivers and lakes, there can be mentioned a method in which a hardener is added to sludge in situ and the hardener-incorporated sludge is kneaded. The reason why the sludge is solidified in situ in the deposited and accumulated state is that the amount of the water contained in the sludge is held to a minimum and the solidification treatment can be performed conveniently. If the sludge is dug out and placed on the land for solidification, the water content in the sludge is increased greatly compared with the sludge deposited naturally.

This known method, however, is defective in that when the deposited sludge is kneaded and agitated by a kneading machine or the sludge is dredged, sea water or the like is contaminated in a broad region to cause secondary pollutions such as the generation of bad odors. Moreover, when the sludge is agitated, water or untreated sludge flows from neighboring sludge layers into the sludge being treated, and therefore, a large quantity of a hardener must be added. In this case, the hardener supplied in such a large amount readily flows into neighboring sludge layers and is wasted. Agitation of the sludge or the like is performed by agitating blades of the kneading machine. Accordingly, the sludge being treated is not completely separated from the sludge present on or around the outer periphery of the rotation locus of the agitating blades and therefore, uniform kneading of the sludge and hardener is not attained, and it is difficult to perform the solidification treatment in good kneading conditions.

SUMMARY OF THE INVENTION

It is a primary object of the present invention to provide an apparatus for the solidification of sludges in which a casing is disposed to surround the kneading zone of the solidification apparatus proper and separate the sludge being treated from neighboring sludge layers, whereby agitation and kneading of the sludge with a hardener can be accomplished effectively and sufficiently, and the hardener can be utilized efficiently.

A secondary object of the present invention is to provide an apparatus for the solidification of sludge in which the cross-section of the upper portion of a casing at a part corresponding to the kneading zone of the solidification apparatus proper is narrowed along the rotation locus of the agitating blades.

A third object of the present invention is to provide an apparatus for the solidification of sludges in which a casing is disposed so that it can shift in the vertical direction with respect to the solidification apparatus proper, and after the sludge and hardener have been agitated in the kneading zone, the apparatus proper is lifted up while the casing is kept in the state projected downwardly from the agitating shafts. When this apparatus is employed, there can be adopted a treatment method in which the sludge being agitated and kneaded is surrounded by the lower portion of the casing, and the treated sludge is withdrawn from the casing when it is in a state which is suitable to be combined with other treated sludges. By this method, the entire sludge layer, from the bottom to the top portion thereof, can be treated effectively and uniformly, and such undesired phenomena as contamination of sea water or the like can be prevented.

DETAILED DESCRIPTION OF THE PREFERRED EMBODIMENTS

One embodiment of the sludge solidification apparatus of the present invention will now be described in detail by reference to FIGS. 1 to 4.

Figure 4:
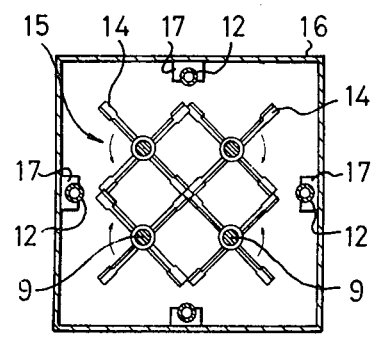
FIG. 4 is a view showing the section taken along the line IV—IV in FIG. 1.

The solidification apparatus proper 1 is hung down by a wire rope 3 so that it can be moved in the vertical direction by lifting means 2 through the wire rope 3. Driving means 4 of the apparatus proper 1 comprises a prime mover 5 such as a hydraulic motor and reduction gear 6. In this embodiment, the reduction gear 5 includes four output shafts, and each output shaft is connected to agitating shaft 9 through a bearing 7 and a shaft coupling 8. Still, it is possible to adopt a modification in which each agitating shaft is rotated so as to be synchronized by the driving means. The upper portions of the four agitating shafts 9 are held in parallel to each other by frame plates 10 through bearing 11. Rails 12 are attached to the top ends of respective crossing arms of the frame plates 10. In this embodiment, a pipe is used as the rail 12. The upper portion of the pipe is fixed to he reduction gear 6 and the top end of the pipe is connected through a conduit to a hardener supply source A for feeding a hardener under pressure by a pump or the like. The lower end of the pipe is communicated with a kneading zone 15 described below, and a hardener injection opening 13 is formed on the lower end of the pipe. A plurality of agitating blades 14 are attached to the lower portion of the agitating shaft 9, so that the blades 14 are regularly arranged with a phase difference being 90° between every two adjacent blades 14. Moveover, the positions of the blades 14 attached to respective agitating shafts 9 are deviated with respect to the axial direction so that they do not interfere with one another. If each of the agitating shafts is rotated so as to be synchronized with each other by driving means, it is possible to adopt a modification in which the agitating blades 14 are provided on several adjacent levels of each of the agitating shaft 9 so that they do not interfere with one another. The rotation directions of every adjacent two agitating shafts 9 are reversed to each other, but the directions (phases) of respective agitating blades 14 of the agitating shafts 9 are made identical as shown in FIG. 4, whereby good agitating and keading conditions can be attained. Rotation directions of the agitating shafts 9 are set by the reduction gear 6 so that the rotation directions of every adjacent agitating shafts 9 are reversed to each other as pointed out above, whereby the apparatus proper 1 is prevented from rotation while the agitating shafts 9 are driven and rotated. A pilot cutter blades is attached to the bottom end of each agitating shaft 9 so that the apparatus proper 1 can easily pierce into a sludge layer. A cylindrical casing 16 surrounding the kneading zone 15 formed by the agitating blades 14 is mounted so that it can shift in the vertical direction with respect to the apparatus proper 1. The length of the casing 16 in the axial direction in about 2 times the length of the kneading zone 15. A guide member 17 having a U-shaped section is disposed on the inner wall of the casing 16 to extend in the axial direction thereof. By sliding movement of the guide member 17 along the rail 12, the casing 16 is moved in the vertical direction. A stopper 18 is attached to the top end of the casing 16 and the uppermost or lowermost position of the casing 16 is set at a point where the stopper 18 is caused to fall in pressing contact with the lower portion of the reduction gear 6 or the frame plate 10. The casing 16 shifts downwardly by its own weight, but when the lower end of the casing 16 is stopped by the ground and the apparatus proper 1 is moved downwardly by the lifting means 2, the casing 16 shifts relatively upwardly with respect to the apparatus proper 1. Teeth 19 are formed on all the circumference of the lower end portion of the casing 16 and the casing 16 is held on the ground stably by these teeth 19.

The sectional shape of the casing 16 is appropriately chosen so that the solidification of the sludge layer can be performed conveniently. For example, the casing 16 may have a triangular, square or hexagonal section. In the above embodiment, the rail 12 is disposed so that it also acts as a hardener supply passage. Of course, an independent pipe for supply of the hardener may be disposed at the center of each agitating shaft 9. It also is possible to adopt an arrangement in which the rail 12 is disposed in the casing 16 and the guiding member 17 is mounted on the frame plate 10.

The sludge solidification treatment method using the solidification apparatus having the above-mentioned structure will now be described.

At first, the solidification apparatus pierces into the sludge layer until the lower end of the casing 16 arrives at the bottom portion of the sludge layer. This operation will detailed hereinafter. When the lower end of the casing 16 arrives at the bottom portion of the sludge layer, a treatment region of the sludge layer is surrounded and defined by this casing 16 so that the defined treatment region is separated from other regions of the sludge layer. Accordingly, the sludge layer is sufficiently kneaded with the hardener in this defined region and contamination of sea water or the like or occurrence of the secondary pollution can be effectively prevented. Further, since the treatment region of the sludge layer is enclosed without disturbing the natural deposition and accumulation state, the amount of the water contained in the sludge in the defined region is maintained at the original low level comparable with the sludge deposited naturally. Therefore, the amount of the hardener used is remarkably small when compared with the amount used in the conventional method. The solidification apparatus proper 1 makes vertical movement within the casing 16 and agitating shafts 9 of the apparatus proper 1 are rotated in this state. Accordingly, the sludge is sufficiently kneaded and agitated with the hardener uniformly from the bottom to the top.

Another embodiment of the sludge solidification apparatus of the present invention will now be described in detail by reference to FIG. 5.

Figure 6:
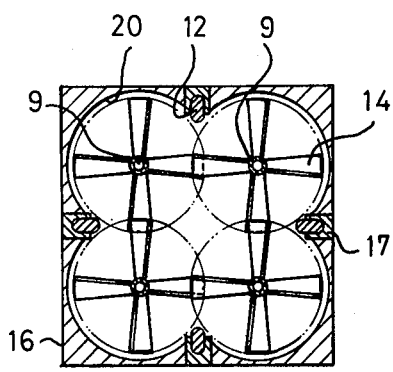
FIG. 6 is a view showing the section taken along the line IV—IV in FIG.5.
Figure 7:
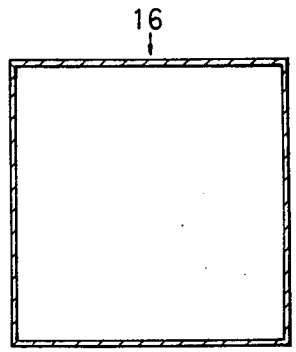
FIG. 7 is a view showing the section taken along the line VII—VII in FIG. 5.

In this second embodiment, the cross-section of the inner circumferential wall in the upper portion of the casing 16 is narrowed along the rotation locus of the agitating blades 14. In this embodiment, the cross-section of the casing 16 has a square form as a whole, but as shown in FIG. 6, in the upper portion of the casing 16, in the interior of this cross-sectional shape, four arcs 20 of four circles are formed to define the thickness of the casing and the inner hollow portion. It also is possible to reduce the diameter of the casing 16 in the upper portion thereof to narrow the cross-section in the upper portion of the casing 16. In the lower portion of the casing 16, both the outer and inner sectional forms are made square so that when the apparatus proper 1 and the casing 16 are withdrawn from the sludge layer, the sludge layer is solidified in the form of a pile having a square cross-section. The hardener supply passage is constructed by a pipe 21 mounted at the center of each agitating shaft 9. Namely, the agitating shaft 9 has a hollow structure and this hollow interior portion is used as the hardener supply passage. The top end of the agitating shaft 9 is connected to the hardener supply source through a passage penetrating the reduction gear 6, and a hardener injection opening 23 is formed on a passage extended from the lower portion of the agitating shaft 9. Relative vertical movement of the casing 16 to the apparatus proper 1 is performed by sliding movement of the rail 12 and guide member 17. In this embodiment, no hardener supply passage is formed on the rail 12. Other structural arrangements and functions in this embodiment are the same as those in the above-mentioned first embodiment. Members having the same structure and function as those of the members in the first embodiment are indicated by the same reference numerals as used in the first embodiment. It is preferred in this embodiment that the shape of the inner cross-section of the narrowed upper portion of the casing 16 be as similar to the cross-sectional shape of the lower treatment region-defining portion as possible.

In the solidification apparatus according to the above-mentioned second embodiment, the inner circumferential wall of the casing 16 at a part corresponding to the kneading zone 15 is narrowed along the locus of rotation of the agitating blade 14, whereby the sludge in the casing 16 can be kneaded and agitated sufficiently with the hardener. Further, even though the upper portion of the casing 16 is narrowed as pointed out hereinbefore, the casing 16 has a prescribed polygonal cross-sectional shape in the portion below this narrowed upper portion, and even after the apparatus proper 1 has been drawn up from the sludge, the casing 1 is still located at the lowered position. Accordingly, the sludge has the prescribed polygonal cross-section when it separates from the casing 16 after the agitating and kneading treatment.

The sludge solidification method of the present invention will now be described in detail by reference to FIG. 8.

Figure 1:
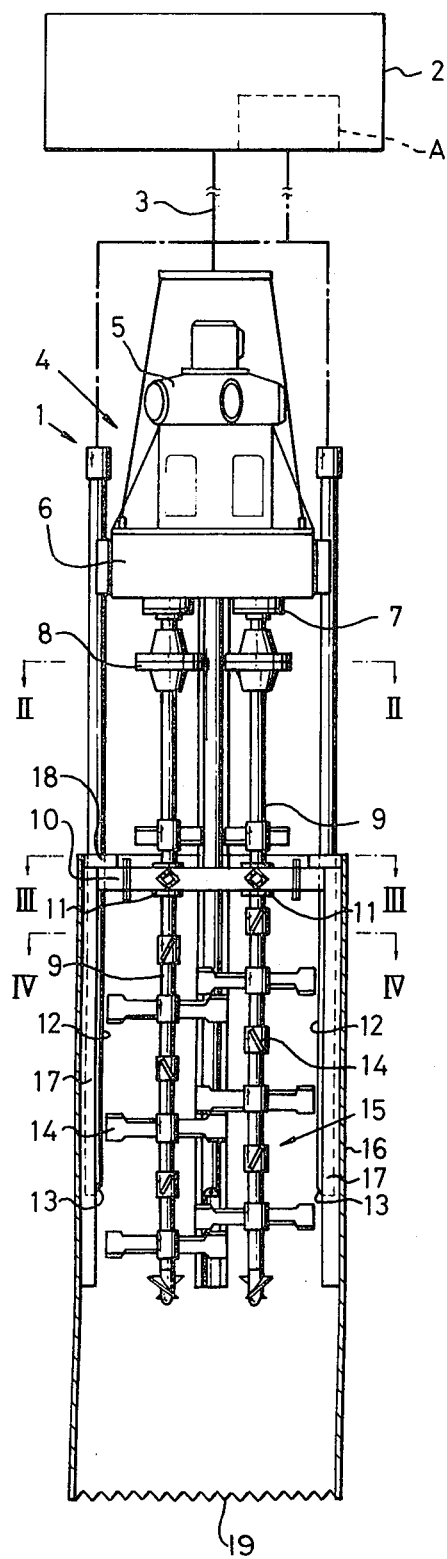
FIG. 1 is a partially cut-away front view illustrating one embodiment of the sludge solidification apparatus of the present invention.
Figure 2:
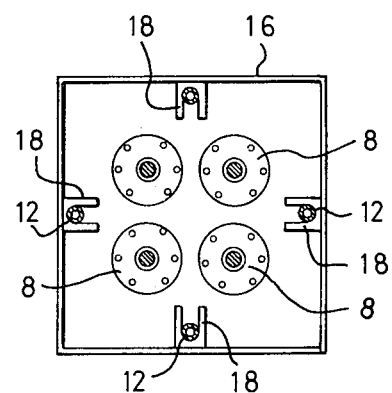
FIG. 2 is a view showing the section taken along the line II—II in FIG. 1.
Figure 3:
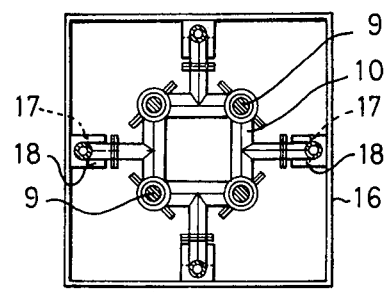
FIG. 3 is a view showing the section taken along the line III—III in FIG. 1.
Figure 5:
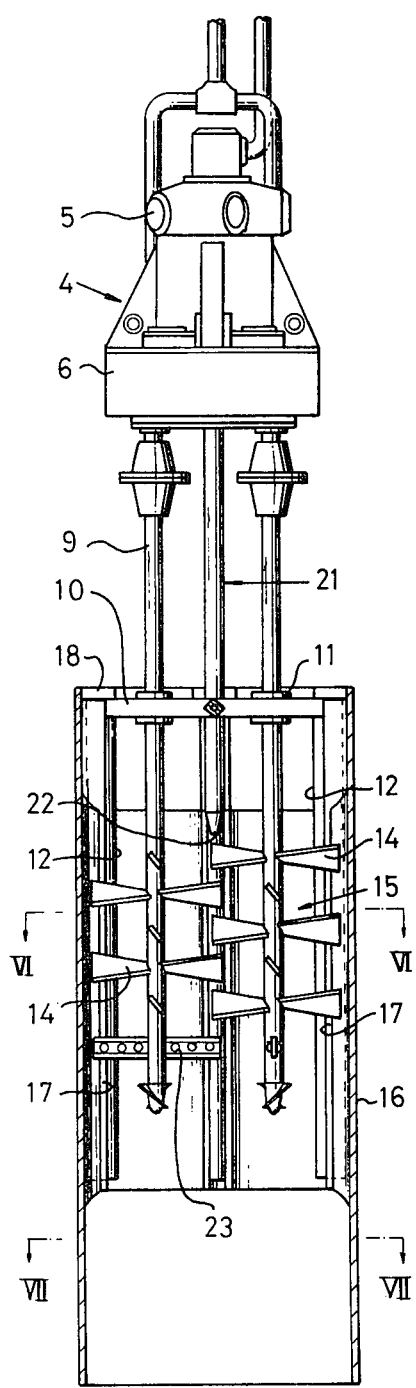
FIG. 5 is a partially cut-away front view illustrating another embodiment of the sludge solidification apparatus of the present invention.
Figure 8:
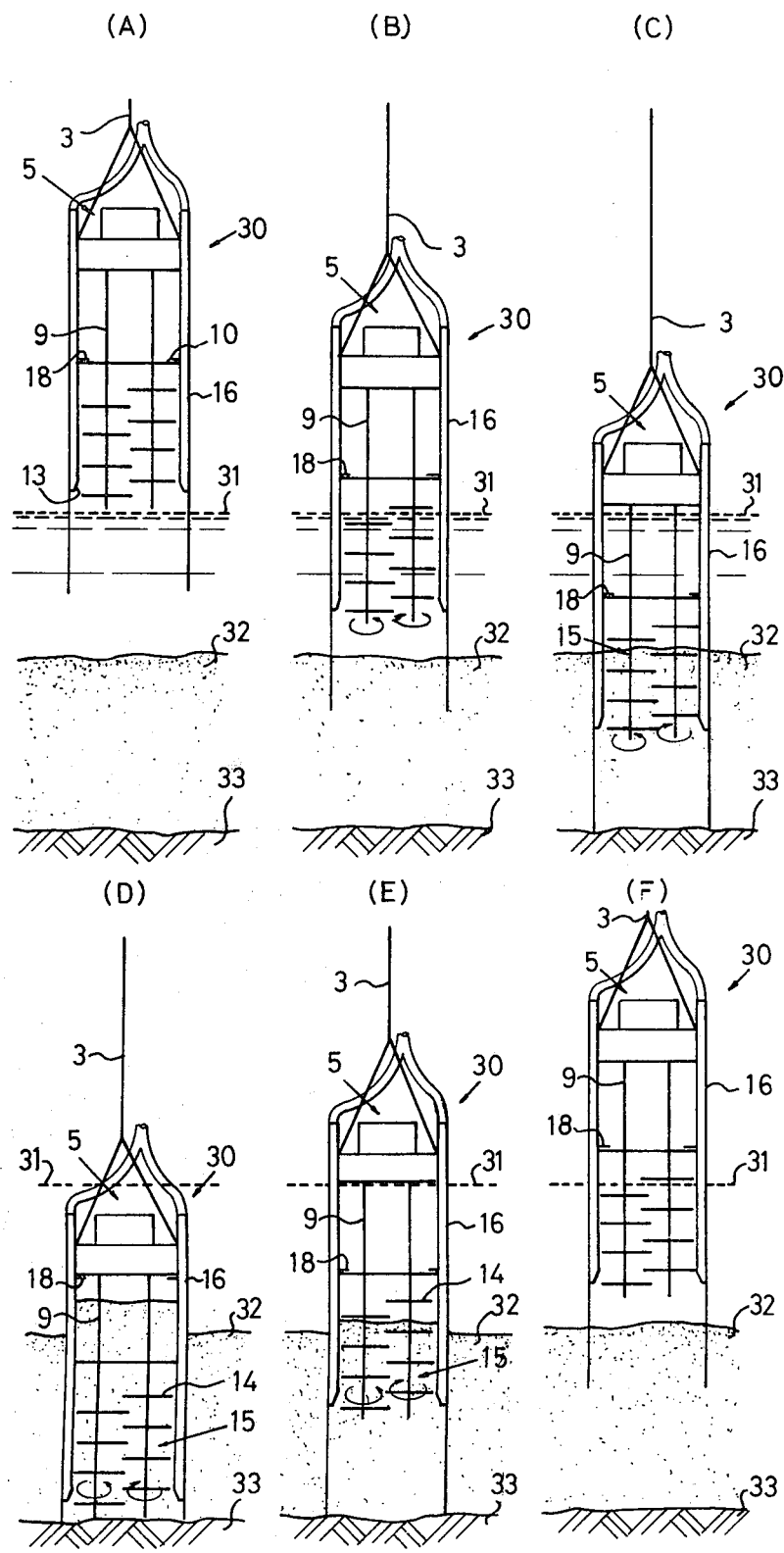
FIGS. 8-A to 8-F are views showing the steps of the sludge solidification method according to the the present invention.

Referring to FIG. 8, a solidification apparatus 30 having a structure as shown in FIG. 1 or 5 is moved both in the horizontal direction and vertical direction by the lifting means 2 through the wire rope 3. Namely, the position of the apparatus 30 in the horizontal direction is first set and then, it is lowered by the lifting means 2 as shown in FIG. 8-A. In this case, the casing 16 is located at the lowermost position by its own weight. The lower portion of the casing 16 pierces into water 31 and a sludge layer 32 by the weight of the casing 16 per se. When the lower end of each agitating shaft 9 arrives at the sludge layer 32 (see FIG. 8-B), the driving means 4 is driven and the solidification apparatus 30 pieces into the sludge layer while the hardener is fed to the kneading zone 15 from the injection opening 13. When the sludge layer 32 is so hard that that the casing 16 is not allowed to sink into the sludge layer 32 by its own weight, after the stopper 18 has fallen into pressing contact with the lower portion of the reduction gear 6, the casing 16 pierces into the sludge layer 32 integrally with the apparatus proper 1.

The fed rate of the hardener is appropriately determined depending on the piercing speed of the solidification apparatus.

After the casing 16 has arrived at the bottom 33 of the sludge layer 32 as shown in FIG. 8-C, the apparatus proper 1 is further moved downwardly in the casing 16 while driving and rotating the agitating shafts 9 and continuing supply of the hardener. In this case, the rail 12 of the apparatus proper 1 makes sliding movement on the guide member 17. When the lower ends of the agitating shafts 9 arrive at the bottom 33 of the sludge layer 32 as shown in FIG. 8-D, supply of the hardener is stopped, but agitation of the sludge and the hardener is continued. When the sludge in the casing 16 is sufficiently kneaded with the hardener, the apparatus proper 1 is pulled upwardly by the lifting means 2 while keeping the casing 16 stationary at the above position and continuing agitation. This state is shown in FIG. 8-E. When the frame plate 10 is caused to fall in pressing contact with the stopper 18 of the casing 16, the casing 16 is drawn up integrally with the solidification apparatus proper 1. In this case, the lower portion of the casing 16 is in the state projected downwardly from the lower ends of the agitating shafts 9. Namely, drawing-up of the casing 16 is delayed behind drawing-up of the kneading zone 15 so that the treated sludge is kept in the prescribed polygonal form and the untreated sludge is prevented from intruding into the casing 16 from the bottom portion thereof. After the state where the agitating shafts 9 are drawn up from the sludge layer as shown in FIG. 8-F is confirmed, the agitation is stopped and the solidification apparatus 30 is withdrawn upwardly. It is possible to adopt a modification in which the agitation is conducted while moving the solidification apparatus proper 1 up and down according to need with the above-mentioned relation being established between the apparatus proper 1 and the casing 16. Still, it is possible to adopt an arrangement in which a hardener is supplied when the solidification apparatus pierces into the sludge, and also when the apparatus is drawn up from the sludge layer.

According to the method of the present invention, sludge can be treated over a broad area by repeating the above procedures. Examples of the sludge treatment according to the method of the present invention will now be described.

EXAMPLE 1

Figure 9:
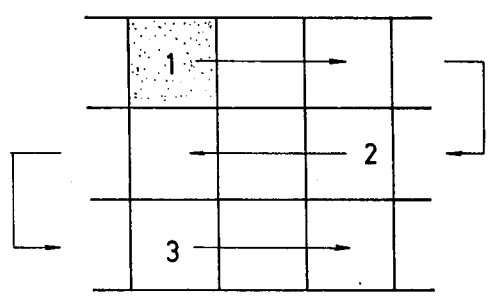
FIGS. 9-12 show patterns of treatment for large areas.

Referring to FIG. 9, a first row of the sludge layer is gradually treated in the direction 1 by repeating the above procedures while lapping a prescribed amount of the sludge with the casing of the sludge solidification apparatus. In the same manner, second and third rows of the sludge are gradually treated in the directions 2 and 3, respectively.

EXAMPLE 2

Figure 10:
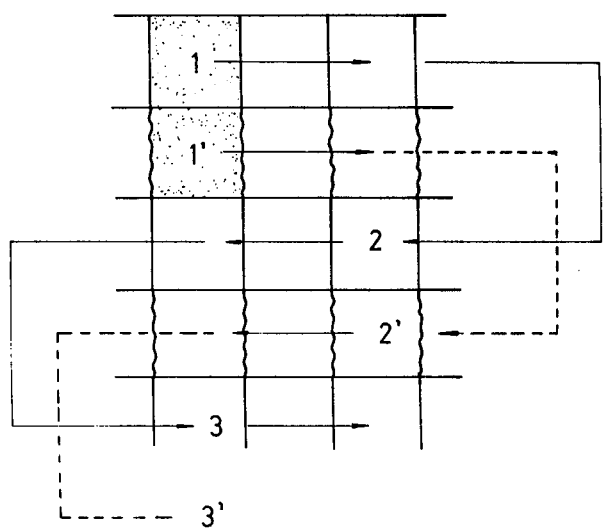

Referring to FIG. 10, in the same manner as described in Example 1, a first row of the sludge is treated in the direction 1 while lapping a prescribed amount of the sludge with the casing 16. Then, a second row of the sludge spaced from the first row by a distance substantially equal to the lateral width of the solidification treatment apparatus is treated in the direction 2, and a third row of the sludge is similarly treated in the direction 3. Then, the casing 16 is dismounted from the solidification apparatus 30 and untreated rows interposed between the treated rows are gradually treated in the directions 1', 2', and 3', respectively.

When the sludge treatment is carried out according to this example, the primarily treated rows 1, 2, and 3 act as the casing, and therefore, although the first treatment of the later stage is conducted while the two faces are being contacted with the untreated sludge, the second and subsequent treatments of later stage can be preformed while only one face is being contacted with the untreated sludge. Accordingly, incorporation of the untreated sludge is remarkably reduced, and the treatment of the later stage can be accomplished with the casing 16 being dismounted and the solidification apparatus can pierce the material with ease. Thus, the sludge of a broad area can be treated at high efficiency.

EXAMPLE 3

Figure 11:
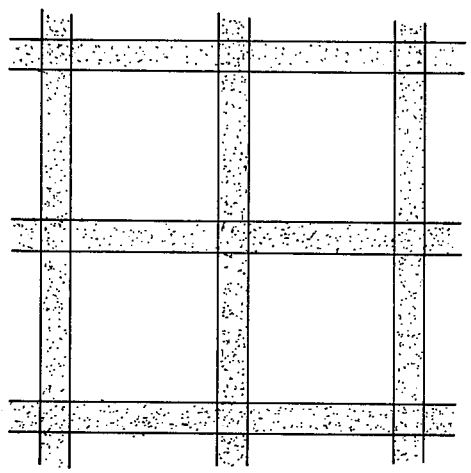
Figure 12:
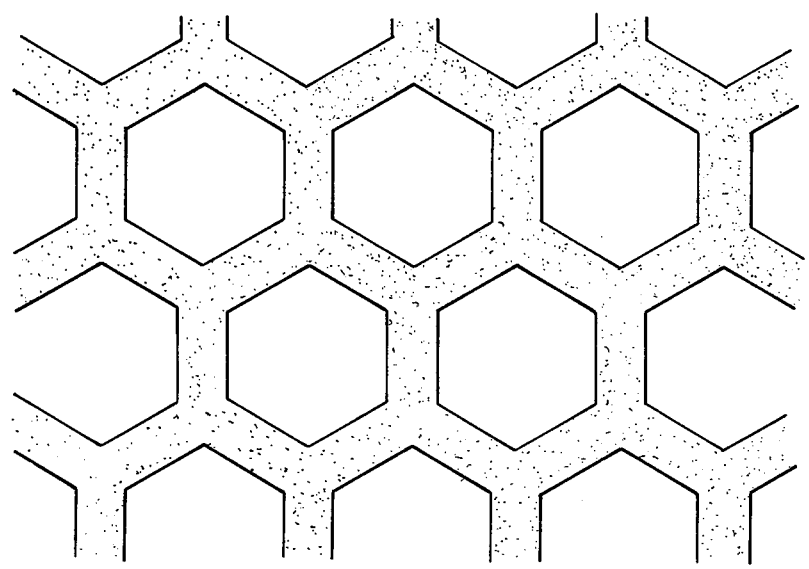

Referring to FIGS. 11 and 12, the sludge of a prescribed area is continuously treated while lapping a prescribed amount of the sludge in a checkered or hexagonal pattern, whereby the sludge of this prescribed area is divided into small blocks. Enclosures are formed around these blocks, and the central portion of each enclosed block is treated while lapping a prescribed amount of the sludge with the casing on or in the state where the casing has been dismounted.

According to this treating method, soil conditions can be suitably adapted to the intended use of the treated soil by changing the treating state in central portions of respective divided blocks. Moreover, these central portions may be left untreated if required so as to attain desirable soil properties, or in each portion only a partial space may be treated, or only upper portion may be treated, and/or the mixing ratio of the hardener can be varied in these central portions. Therefore, the desired soil properties can be attained at high efficiency by the above treatment method.

According to the sludge treatment method of the present invention, as will be apparent from the foregoing illustration, the sludge can be sufficiently kneaded and agitated with the hardener in the casing 16, and since the solidification apparatus proper 1 is moved up and down in the casing, the sludge layer can be sufficiently agitated uniformly from the top to the bottom. Further, when the solidification apparatus proper 1 pierced into the sludge layer is drawn up, the lower portion of the casing 16 is projected downwardly below the agitating shafts 9 and hence, the treated sludge is discharged from the casing 16 after reaction of the hardener has advanced to some extent in the sludge and the product has come to have a polygonal column form. Therefore, incorporation of the untreated sludge into the treated sludge can be effectively prevented, and with use of a minimum amount of the hardener, the sludge can be treated so that the treated sludge will have desirable soil properties.

Moveover, according to the sludge solidification method of the present invention, by treating the sludge gradually in succession by repeating the procedures of piercing the solidification apparatus into the sludge layer and drawing it up from the sludge layer, sludge of a broad area can be treated at high efficiency.

Still further, according to the present invention, sludges deposited on the bottom portions of harbors, rivers, lakes and the like can be treated in situ at the deposited positions without dredging or shafting them, and the deposited sludges can be sufficiently kneaded and agitated with a hardener in the casing. Therefore, a prescribed amount of the sludge is separated and closed from the outer region of the sludge by the casing in the water. Therefore, occurrence of secondary pollutions such as contamination of sea water or the like and generation of bad odors can be effectively prevented and accumulated sludges can be treated with safety and economical advantages while attaining a high labor-saving effect. Thus, the present invention makes great contributions as a countermeasure for environmental pollution.

What is claimed is:

1. An apparatus for the solidification of sludges which comprises a solidification apparatus proper, lifting means for moving said apparatus proper in the vertical direction, and a cylindrical casing, said apparatus proper including:

driving means;

agitating shafts driven by said driving means, each agitating shaft having on the lower portion thereof a plurality of agitating blades forming a zone for kneading sludge or the like;

a frame plate at the upper limit of said zone and spaced from said driving means, said frame plate rotatably supporting the upper portion of each agitating shaft;

a rail attached to the outer end of said frame plate to extend parallel to said agitating shafts; and means for injecting a hardener into the kneading zone, said cylindrical casing surrounding the entire kneading zone of the apparatus proper and including a guide member disposed on the inner wall of the casing and slidably engaging said rail, whereby said casing can move in the vertical direction with respect to said zone, said casing having teeth along the bottom edge thereof, a stopper attached to the upper portion of the casing defining the lowermost position of the casing when it falls in pressing contact with said frame plate and defining the uppermost position of said casing when said stopper is in pressing contact with the lower surface of said driving means.

2. A sludge solidification apparatus as set forth in claim 1, wherein the inner circumferential wall of the upper portion of the casing at a position corresponding to the kneading zone has a cross-section narrowed along the locus of rotation of the agitating blades and the lower portion of the casing has a cross-section of a form corresponding to a prescribed cross-sectional form for the treated sludge.

3. A sludge solidification apparatus as set forth in claim 1, wherein said driving means includes means for synchronously rotating each of said agitating shafts.

4. A method for the solidification of sludge layers using a solidification apparatus comprising a solidification apparatus proper, a lifting means for moving said apparatus proper in the vertical direction, and a cylindrical casing, said solidification apparatus proper including driving means, agitating shafts driven by said driving means, agitating blades attached to the lower portions of the agitating shafts to form a kneading zone, and means for feeding a hardener into the kneading zone, said casing surrounding said kneading zone of the solidification apparatus proper, said casing being disposed so that it can shift in the vertical direction with respect to the solidification apparatus proper, said solidification method comprising:

the first step of setting the casing at the lowermost position thereof and lowering the apparatus proper with the lifting means until the lower ends of the agitating shafts arrive at the top face of the sludge layer;

the second step of piercing the sludge layer with the apparatus proper while rotating the agitating shafts and supplying the hardener into the kneading zone until the bottom of the casing arrives at the bottom of the sludge layer and the lower ends of the agitating shafts arrive at the bottom of the sludge layer; and the third step of lifting the solidification apparatus proper alone to the position uppermost with respect to the casing while stopping supply of the hardener but continuing rotation of the agitating shafts and then lifting the casing integrally with the solidification apparatus proper to thereby agitate the sludge entirely from the bottom to the top sufficiently to effect the solidification treatment.

* * * * *